United States Patent
Josenhans et al.

(10) Patent No.: US 7,536,199 B2
(45) Date of Patent: May 19, 2009

(54) MOBILE COMMUNICATION DEVICE COVER AND METHOD FOR ITS OPERATION

(75) Inventors: Michael Josenhans, Haltern (DE); Andreas Ahland, Senden (DE)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/560,570

(22) PCT Filed: Jun. 12, 2003

(86) PCT No.: PCT/IB03/02244

§ 371 (c)(1),
(2), (4) Date: Dec. 12, 2005

(87) PCT Pub. No.: WO2004/112356

PCT Pub. Date: Dec. 23, 2004

(65) Prior Publication Data

US 2006/0160560 A1     Jul. 20, 2006

(51) Int. Cl.
*H04M 1/00*     (2006.01)
(52) U.S. Cl. .................. 455/550.1; 455/558; 455/575; 455/575.8; 455/90.3; 379/433.04
(58) Field of Classification Search ............. 455/550.1, 455/90, 558, 575, 556, 419, 41.2, 575.8, 455/90.3, 550; 379/433.04
See application file for complete search history.

(56) References Cited

U.S. PATENT DOCUMENTS

| | | | |
|---|---|---|---|
| 5,357,570 A * | 10/1994 | Tomura et al. ......... 379/433.01 |
| 5,432,705 A * | 7/1995 | Severt et al. ................. 702/120 |
| 5,680,633 A * | 10/1997 | Koenck et al. ......... 235/472.02 |
| 5,848,152 A * | 12/1998 | Slipy et al. ............. 379/433.13 |
| 5,911,121 A * | 6/1999 | Andrews ..................... 455/418 |
| 6,424,842 B1 * | 7/2002 | Winstead .................... 455/557 |
| 6,999,804 B2 * | 2/2006 | Engstrom et al. ........ 455/575.3 |
| 7,162,282 B2 * | 1/2007 | Engstrom et al. ........ 455/575.3 |
| 2002/0013161 A1 * | 1/2002 | Schaeffer et al. ............ 455/557 |
| 2002/0039910 A1 * | 4/2002 | Malthouse .................. 455/558 |
| 2003/0008679 A1 | 1/2003 | Iwata et al. |
| 2003/0017839 A1 * | 1/2003 | Mager ........................ 455/550 |
| 2003/0017848 A1 * | 1/2003 | Engstrom et al. ........... 455/558 |
| 2003/0036362 A1 | 2/2003 | Buesseler et al. |
| 2003/0104791 A1 | 6/2003 | Engstrom et al. |

FOREIGN PATENT DOCUMENTS

| | | |
|---|---|---|
| EP | 1091540 | 4/2001 |
| EP | 1091540 A2 * | 4/2001 |
| FI | EP1091540 A2 * | 11/2001 |
| WO | WO 0211074 | 2/2002 |

* cited by examiner

*Primary Examiner*—Matthew D Anderson
*Assistant Examiner*—Minh D Dao
(74) *Attorney, Agent, or Firm*—Alfred A. Fressola; Ware, Fressola, Van Der Sluys & Adolphson, LLP

(57) ABSTRACT

A portable radio communication device has an exchangeable cover. Specifically the invention relates to a system of a mobile phone to provide multiple functionality and user interoperability to a mobile terminal device. The present invention provides a mobile communication device cover comprising a keyboard and a cover processor. The keyboard and the cover processor are interconnected. The cover is characterized by a bus interface, for connecting the cover processor to a mobile communication module, wherein the bus interface is adapted to operate with a plurality of mobile communication modules.

18 Claims, 8 Drawing Sheets

MOBILE COMMUNICATION DEVICE COVER AND METHOD FOR ITS OPERATION

CROSS REFERENCE TO RELATED APPLICATIONS

This application is for entry into the U.S. national phase under §371 for International Application No. PCT/IB03/002244 having an international filing date of Jun. 12, 2003 and from which priority is claimed under all applicable sections of Title 35 of the United States Code including, but not limited to, Sections 120, 363 and 365(c).

TECHNICAL FIELD

The present invention relates to a portable radio communication device having an exchangeable cover. It also relates to an exchangeable cover for a mobile communication device. More specifically the invention relates to a system of a mobile phone to provide multiple functionality and user interoperability to a mobile terminal device.

BACKGROUND OF THE INVENTION

Removable covers for mobile terminal devices are already known from mobile phones which are currently in use. Patent applications disclosing relevant state of the art are e.g. WO 97/32423, WO 01/86922 A1, EP 1 198 110 A2 and U.S. Pat. No. 6,118,986.

The document WO 97/32423 discloses a clip-on cover for mobile phones having only decorative or design changing functions so that the external appearance of a mobile phone can easily be changed.

The document WO 01/86922 A1 discloses a clip-on cover for mobile phones that comprises distinguishing identity means so that a processor in said phone can identify the characteristics of the cover. The phone can therefore adapt its functionality and the functionality of its display to the functionality of said identified personalized cover. The cover according to this document can comprise a microchip to change the functionality of the phone.

The document EP 1 198 110 A2 1 discloses a clip-on cover for mobile phones that comprise different key arrangements to improve the usability of the phone for preferred usage applications. Such an exchangeable cover is e.g. applied at the 3610i Nokia phone.

The U.S. Pat. No. 6,118,986 describes small pager devices, which can use a small attachable credit card-size keypad to provide a full phone calculator or navigator functionality to said pager device. The credit card sized keypad element can also comprise a display to be adaptable to different kinds of applications.

Phone and communication device personalization, internationalization and customization require many efforts in various handling situations.

All the above approaches for personalization, internationalization and customization have in common that they are not suitable for a market with fast changing communication device models as in the case of mobile phones or handheld computers. Due to short cycles times in which a single telephone of communication device type is manufactured the customization market has nearly no time to react and a certain telephone type may have disappeared before suitable changing covers have been developed.

SUMMARY OF THE INVENTION

Therefore, a changeable cover system is needed that can overcome these problems.

So it is desirable to have a mobile phone architecture that can provide an optimized and principally arbitrarily interchangeable cover for a mobile communication device.

The present invention is based on the idea to provide a new approach in the provision of mobile communication devices with exchangeable covers, by proposing an exchangeable phone or communication module instead of an exchangeable cover.

The invention starts from the first approach for exchangeable covers to adapt the outer appearance of mobile communication devices such as mobile telephones, continues to the second step of differently shaped key and keypads which are provided to press the keys of the underlying communication device. Further the invention recognizes that extension modules for basic radio communication modules have been developed.

The present invention overcomes the drawbacks of the state of the art by providing an exchangeable cover having a keypad. The cover according to the present invention is characterized by a cover processor, which is connected to said keypad. The cover according to the invention is further characterized in that said cover processor is connected to a standardized bus or a standardized bus interface. So the present invention is to provide a device that comprises basically two elements, i.e. a communication module and a cover module. Both elements comprise a bus interface for exchanging input and/or output data via a standardized interface. Thereby, two important advantages can be provided. First, the cover functionality and the phone module functionality can independently be developed without the need for mutual provisions for additional adapted functionality. Second, it may be sufficient to develop only one communication module for each desired application, i.e. two band GSM-Phones, tri-band GSM Phones that can also be used in the United States of America or the new UMTS or other subsequent standards. Even modules comprising combinations of GSM and/or UMTS modules are possible.

The present invention provides an intelligent cover with at least a keypad that is characterized by a cover processor and a bus interface to connect the cover processor with said keypad to a communication module. Preferably, a controller can be used. The controller can control said bus and said keypad. It can be a preferred implementation to have the display implemented in the phone module.

In another example embodiment said cover further comprises a display, wherein said display is connected to said bus interface, for connecting said display to a processor of a mobile communication module. A direct implementation of a keyboard and a cover comprise the advantages that input selection features such as menu keys or functional keys with a changing description on the display can be implemented more readily. So in an integrated cover comprising a display and a keyboard the adaptation of the display functionality and the keyboard functionality is significantly simplified.

This is especially the case, if the keyboard and the display are implemented integrally as a touch screen display. Moreover a display controller can be provided in the cover that can also be integrally implemented in the cover processor.

According to another aspect of the invention the controller may comprise a keypad abstraction controller. Optionally a separate display controller is provided. The controller(s) communicate with the phone itself via a specified bus and specified protocol. This protocol can be, for example, based on ASCII code, Unicode or any other appropriate code. By introducing this abstraction layer it will be possible to operate a phone with different covers which have different functionality, for example internationalization, keypad functionality, additional game pads or joy-stick, or the implementation of e.g. an Internet-Pad, a Surf- or Navigation pad, or e.g. a GPS- or Map-pad device.

It may be noted that the invention goes beyond the basic approach for mobile communication device covers that have been based on a mobile communication device as a means to change the appearance of said phone. The present invention is based more on a cover device with a changeable communication module. In the state of the art it has always been emphasized which part is the "main part", and which part is the "exchangeable part". In the present invention this strict border becomes blurred. Hitherto only a single phone module has been provided with different exchangeable covers, but there has been no possibility to select two or more different phone modules for just one single cover. So, in contrast to the state of the art a user may also change the communication module e.g. to a UMTS phone and keep his old cover as the preferred one he is used to.

In another example embodiment said cover further comprises a battery module. By integrating a battery module into the cover (or a subset of cover integrated features) the battery module need not be attached to or integrated in the communication module. Another advantage by integrating the power source into the cover resides in the estimable power consumption. If there are many power-consuming modules integrated into the cover, the cover may primarily determine the required battery capacity. Another advantage resides in the fact that the communication module can be used for big and small phones, if it has not been designed to carry a huge battery or power packs.

In another example embodiment, said cover further comprises a slot for receiving a communication module. The cover may substantially surround said communication module. The cover can also comprise more than one slot or receiving interfaces for communication modules. The cover may surround a cellular phone module and a cordless module to connect to a telephone line. So, a user may fit his communication device (cover) with different communication modules to be able to connect to different cellular base station systems/standards, and/or to different cordless telephone base stations. Therefore a user may fit his personal cover with a GSM-, a UMTS and a cordless system phone module, and may therefore be able to phone whenever and wherever a cell of wireless communication network can be reached.

According to another aspect, the present invention provides a mobile communication module. The mobile communication module comprises a radio interface for connecting e.g. to a mobile telephone base station or a cordless telephone base station for connecting to a communication network. The mobile communication module is characterized by a standardized bus interface; to connect said communication module to a cover, which has at least a key-based input device such as a navigation button, a keypad or a keyboard.

By using a standardized bus system to communicate with the communication module a personalization, internationalization and customization of the device can be performed simply by adapting the functionality of the cover with a minimum effort in variant handling. So different layouts for a single phone can be provided by a standard interface to the same phone module and a number of feature-adapted standard interface covers. The phone module itself will remain the same for several variants. This reduces the number of different phone variants. Thus a huge amount of testing and development effort would be unnecessary.

So in consequence to the proposed solution, the phone processor need not handle the complete functionality of the different phone covers, as all possible signals on the bus are already determined. This entails that all cover variants must only be designed and tested for fulfilling the bus standard. So different covers and cover designs can be developed after the phone launch. Due to the standard interface, intelligent covers are independent in the design cycle.

In another example embodiment of the present invention said mobile communication module further comprises a display. This embodiment represents another principle ideas to cooperate with a key only cover that is connected to the communication module via a bus system.

In an additional example embodiment said radio interface of said mobile communication module comprises a cordless telephone interface. Thereby a user can also adapt the appearance of his cordless home phone to his preferred style. Another advantage of such a system resides in the fact that the user can simply access and adapt his own home phone to his preferred phone system in regard of appearance, design an the like. The user benefits form well known menu structures for phone applications. Another advantage resides in the fact that the user can build up closer relationship to the producer of his communication equipment, as he may be able to use same components for in-house and outdoor telephone applications.

In another example embodiment of the preset invention, said communication module comprises a mobile or cellular telephone interface. So the communication device can be used as a cellular telephone.

In yet another example embodiment of the preset invention, said mobile communication module further comprises a microphone and a loudspeaker. Both, the microphone and the loudspeaker can also be implemented in the cover.

In another example embodiment the mobile communication module comprises a battery module and a minimal user interface to provide basic telephone functionality. So the user may use the phone module even if the cover has been damaged. The battery module can also be provided in a module that can be integrated into the cover or into the communication module. It is also possible to use the bus system and e.g. a mechanic interface between the cover and the phone module to provide a battery in an adapter like or connector like fashion. It may also be possible to use adapters to connect the covers and the phone modules of different phone serials. Such an adapter may require a bus converter.

The mobile phone interface can be provided with a respective battery, a respective keypad, menu key or the like basic communication features even if no cover is actually attached.

According to another aspect of the present invention a mobile communication device is provided. The mobile communication device is characterized by an intelligent mobile communication device cover as described in the preceding specification and by a mobile communication module according to the preceding description.

It may be noted that the subscriber identification module (i.e. the SIM-card) may be inserted in the cover or the phone module. If the SIM-card is installed in the phone module, the system may be regarded as a telephone with a changeable cover. If the SIM-card is installed in the cover, the system may be regarded as an electronic device with a plug-in telephone module.

According to another aspect of the present invention a method for handling input data in mobile communication devices having a detachable intelligent mobile communication device cover and a mobile communication module is provided. The method comprises receiving input at said cover, converting said input that so that it fits a specified protocol, transferring said converted input via a specified bus to said mobile phone module and processing or executing said transferred input in said mobile telephone.

The input is received at the cover by key, touch screen or the like that is pressed by a user. The input is then converted according to a standardized bus protocol and transferred for the execution to the telephone module.

In another example embodiment of the present invention, the method further comprises generating or receiving data to be output in said communication module, converting said output according to a specified protocol in said communication module, transferring said converted output via a specified bus to said detachable intelligent mobile communication device cover, and outputting said received output via a display in said intelligent cover.

This section of the method describes the basic functionality of the transfer of output data to the cover via a standardized bus. The direction of the method is used for operating a display on the cover or for operating a sound generator for generating a call signal.

According to yet another aspect of the invention, a software tool is provided comprising program code means stored on a readable medium for carrying out the method of the preceding description when said program is run on a phone module or an intelligent cover of a clip-on cover mobile phone.

According to another aspect of the present invention, a computer program product downloadable from a server for carrying out the method of the preceding description is provided. Said computer program means, comprises program code means for performing all of the steps of the preceding methods when said program is run on a on a phone module or an intelligent cover of a clip-on cover mobile phone.

According to yet another aspect of the invention, a computer program product is provided comprising program code means stored on a computer readable medium. Said program code means are for carrying out the methods of the preceding description, when said program product is run on a phone module or an intelligent cover of a "clip-on" cover mobile phone.

BRIEF DESCRIPTION OF THE DRAWINGS

In the following, the invention will be described in detail by referring to the enclosed drawings in which.

DETAILED DESCRIPTION

Figure 1:
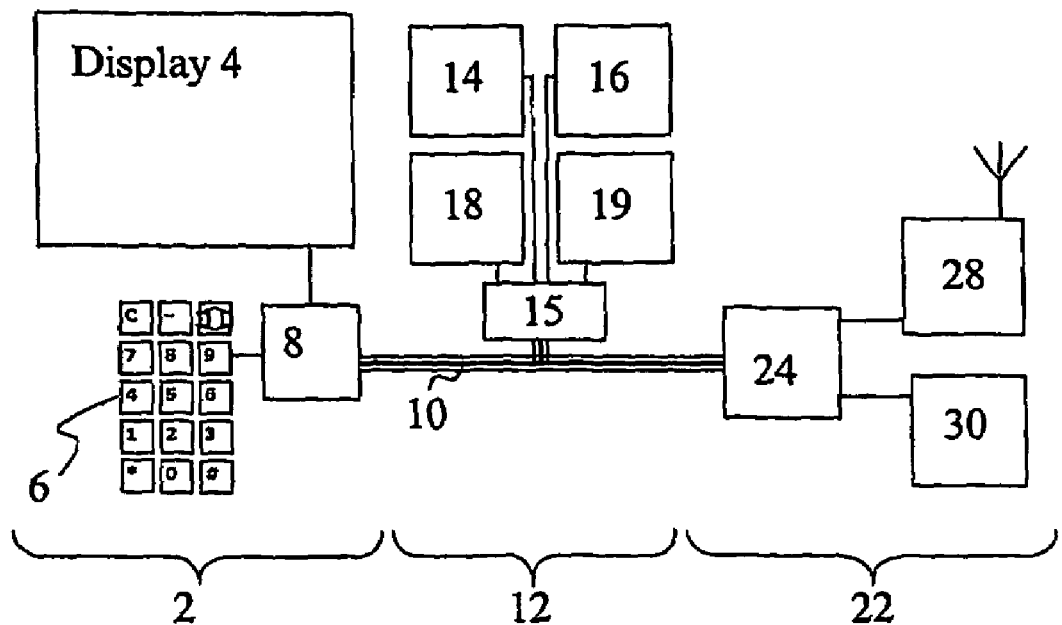
FIG. 1 is a block diagram of a mobile communication device having a communication module and an exchangeable cover interconnected via a standardizes bus.

FIG. 1 is a block diagram of a mobile communication device. For the sake of illustration the communication device is described for the example of a mobile phone. The communication device comprises a telephone module 22 and an exchangeable cover 2 interconnected via a standardized bus 10. The cover 2 comprises at least a display 4, a user input device 6 depicted as a keypad and a cover processor or controller 8. The cover processor 8 is configured to translate or convert signals received via said bus 10 to signals for said display 4. The cover processor 8 is further configured to translate or convert signals received from said keypad to signals to be transferred via said bus 10 to a mobile phone module 22. The display 4 may be provided with its own display processor (not depicted) that can directly be connected to the bus 10. Alternatively the cover 2 may provide an alternative interface between the display 4 and the communication module 22. The display may optionally provide itself or the module 22 with information on its capabilities via the standardized display interface.

The phone module 22 comprises at least a controller 24 that can (at least partially) control the bus 10 traffic and is further configured to control the radio interface module 28 and the memory 30. The radio interface module 28 is a mobile communication transceiver, a phone engine or a phone modem (or the respective packet radio devices modules (GPRS and the like)) e.g. of the GSM, UMTS or one of the future mobile phone standards. The controller 24 can control the access to the bus and operates with cover-specific software. The present invention does not describe the specific way the cover specific software can be uploaded into the phone module. The software may be downloaded from a server, from the cover itself or via any other interface. It is also possible to provide the phone module with an expandable number of pre-stored cover configurations. The download may be executed by sending an SMS with an identification of said cover (and said module) to a respective server.

With these two modules a basic functionality of a mobile phone with an intelligent changeable cover can be provided.

In the figure there is also provided section 12 comprising a controller 15 controlling different modules such as a GPS 14 module, a MP3 player 18 module, a Bluetooth 16 module, a camera module incl. software for handling images, or a Serial I/F-, an USB- (Universal Serial Bus), a Firewire-, Memory card reader and interface module, or an Infrared interface 19 module. These modules are connected via a controller 15 to the bus 10. The modules 14,16,18, 19 can individually be assigned to the cover of the phone module of an additional plug-in or plug-on module may be provided that can deliver a desired functionality. Thus, if one of the additional modules is implemented in the cover of the phone module, the processor 8 or controller 24 can implement the functionality of the controller 15 respectively. Where exactly the dividing line(s) between the cover 2 and the mobile phone module is drawn is not important for the present invention.

The manufacturer can provide different communication modules and different cover modules having different abilities and different features. Therefore, it may happen that a cover module and communication module comprise a similar or even an equal implementation of a certain feature. For example it may happen that a MP3-enabled cover is connected to a MP3-enabled phone. It may also be possible that a combination of a cover and phone module comprises a dedicated module not only once but doubled or even tripled, (one in the phone module, in the cover and one in an additional module). Care should be taken that these tripled devices provide an increased functionality so that a user can benefit even from a double presence of a functionality module. It may happen that a user that likes music purchases a MP3 phone module an MP3 enabled cover and a MP3 enabled plug-on device (e.g. a memory extension). In such a case the user may benefit from the double presence of a certain feature by e.g. an increased memory for storing more different music titles. In case of a double presence of a media player, the exchangeable cover may be used as an exchangeable storage media to transfer music titles or other data between communication devices by changing the covers and copying or transferring data from the communication module to the (short-time clipped on "storage media")-cover or vice versa. Even in other applications the user may benefit form a feature that is present in the cover and in the communication module if an implementation with a higher quality, an implementation with a lower energy consumption or a combination of both features for a higher quality output have been selected.

A power supply is not depicted in the figures, as it is not important in which part of the at least two parts (cover and phone module) the power resource is located, or resources are allocated to. It may also be possible that both parts carry their own power supply. It is possible to provide the modular phone with an additional power module. It is possible to provide the modular phone with an additional feature module. The additional feature module may be a GPS 14 module, a MP3 player 18 module, a Bluetooth 16 module, or a Serial I/F-, an USB- (Universal Serial Bus), a Firewire- or a Infrared interface 19 module. Therefore it may be a preferred solution to also provide a power pack module. A power module many also exchange information with at least one of the controllers 8, 15 or 24 to control the actual power consumption in dependence of the power that can actually be provided.

With this architecture the problems tied to the state of the art of exchangeable covers with different functionality while maintaining the same phone module can easily be solved. There are several advantages.

Exchanging the cover can change the phone functionality. For example, the same phone module could be used either as a small pocket phone, as a messaging phone or as a bigger communicator with a full QWERTY keypad and a larger display. The only difference would be the change of the cover, which even could be done by the user.

Due to the standard interface, additional covers can be designed even if the phone is already marketed, which is a problem with existing architecture, because the phone module must handle the complete cover functionality. Thus all extensions must be known during the phone design phase. So the phone module may also be inserted in a car or e.g. an audio recorder to that is able to send received audio files, even if the idea for such a device has not been present during the design phase of the phone module. So, there may be less phone module variants, as the species-richness is going to be provided by the differentiated covers.

The upper items in the bracket number 2 are included in the inside of the intelligent cover. It comprises the display 4, the keyboard or keypad 6 and the cover processor 8. The cover processor 8 handles all traffic to the user. It handles the complete keyboard 6 management, stores the display layout and handles the display 4 traffic. The cover itself is connected to the phone module via a standardized bus 10 (e.g. Unicode for keyboard entry). Thus the cover can be connected to any kind of phone module.

The phone module 22 itself may consist of several logical blocks. There may be some UI specific blocks in the controller 24, which are chosen according to the mounted cover 2. Additionally, there are the hardware building blocks like the GSM/UMTS phone engine 28. There may also be a GPS 14 module, a MP3 player 18 module, a Bluetooth 16 module, or a Serial I/F-, an USB- (Universal Serial Bus), a Firewire- or a Infrared interface 19 module integrated in the phone module or the cover.

By putting in a standardized interface and an additional cover processor the phone construction will change to a modular approach. One single phone module can handle more than a single functionality by just changing the cover. The user could even do this. The cover itself will contain a processor with an own memory and operational software.

The cover provides a complete abstract interface to the phone. Thus the design and the layout of the keyboard 6 requires no adaptation of the phone software or hardware. The phone and the cover processors communicate via pre-defined signals or messages. The phone may select different operation modes. Some examples for different modes are an editor mode (for number, text (or T9) input), gaming mode, menu navigation and key guard control. For example, in the keyboard layout, the intelligent cover can handle key entry caps lock and control keys. A more detailed description of these modes follows in the description of FIGS. 5 to 11.

In FIG. 1, the intelligent cover provides an interface to the display, too. The cover processor can tell the phone then what kind of display is connected (e.g. screen size, resolution and the available number of colors). Another option would be that the cover processor itself could handle some display-related presentations like UI adaptation.

An intelligent cover could handle much different additional functionality. For example gaming input via a joystick or display light handling, illumination alignment and display contrast adjustments can also be handled.

To implement the present invention it is proposed to use the following approach: Implement a cover containing a processor, define a protocol for proper interaction between the phone module and the intelligent cover whereby the protocol must permit an adequate functional freedom, transfer the key control from the phone to the keypad abstraction processor in the cover, implement different UI styles in the phone, which are selected automatically if another display is chosen or is connected and the display signals are routed via the standardized display interface either by a direct interface or by the cover processor.

Figure 2:
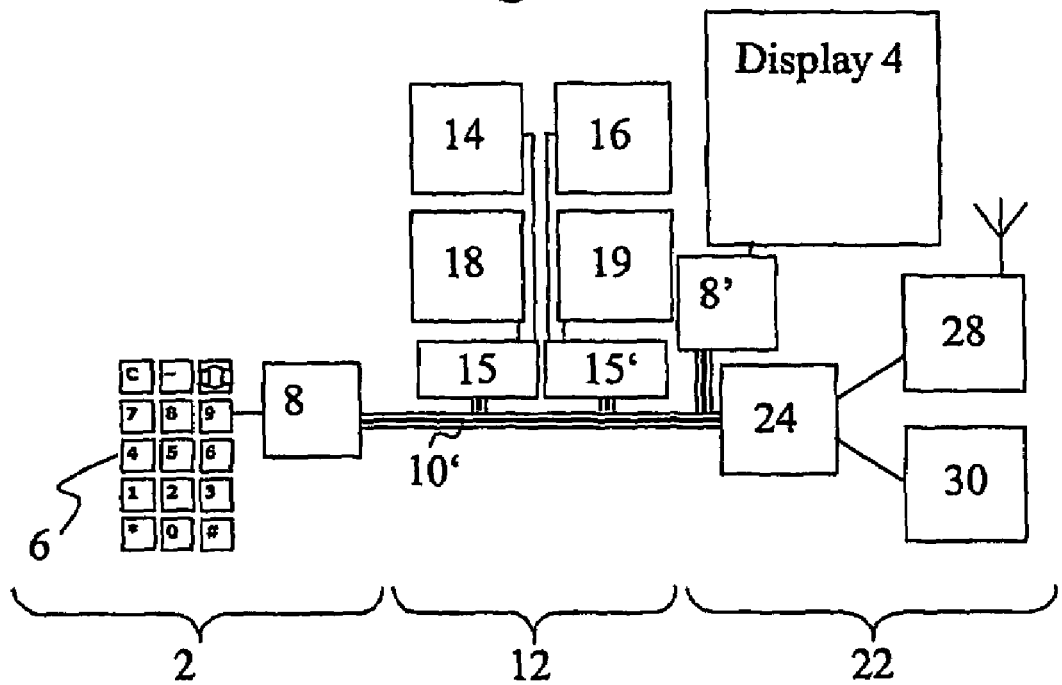
FIG. 2 is a block diagram of a mobile communication device in another implementation.

In FIG. 2 the display owns its own display processor 8' connected to the bus 10'. Alternatively, the telephone module can provide an alternative interface to the display 4. The display 4 may optionally provide itself or the module with information on its capabilities via the standardized display interface. By using dedicated display controller 8' the different tasks of a display controller 8' and cover processor 8 can be taken into account. Different task-specific processors and controllers 8, 8' can more readily be optimized. In the case that the bus has to transfer e.g. video data, the bus may have to be implemented as high-performance bus 10' with an increased data rate.

The above disclosed architecture can comprise a solution for a not so eminent problem that arises when using the T9 logic or when entering a PIN (Personal Identification Number). The problem arises from the fact that an input directed to a communication device (the PIN "26580") and the respective content to be displayed (***) can differ significantly. In the disclosed architecture the cover processor 8 may generate two different bus signals, one for the display controller 8' (*) and one for the controller 24 (26580). Another possibility resides in that the cover processor generates 8 only one bus signal to the controller 24 (26580), which in turn generates a bus signal for the display controller 8' (***). The bus architecture can be used to solve nearly every problem arising in the implementation of additional hardware blocks or features in a modular communication device. Even the display may be implemented in the cover 2 or in the communication module 22. A combination of a display-less cover with a display-less communication module may even lead to cheap implementation of a complete display-less communication device e.g. for blind people.

As in FIG. 1, the hardware building blocks 14 and 18 are directly connected to the bus via the controller 15. The hardware building blocks 16 and 19 are directly connected to the bus 10' via the controller 15', to indicate that the single hardware blocks may be distributed between the cover and the communication module.

To implement the present invention it is proposed to use the following approach: Implement a cover containing a keyboard and a processor, define a protocol for proper interaction between the phone module and the intelligent cover whereby the protocol must permit an adequate functional freedom, to transfer the key control from the phone to the keypad abstraction processor in the cover, implement different keypad UI styles in the phone, adapted to the actual keys on the cover which are selected automatically.

The other elements are the same as in FIG. 1 and are therefore not explicitly described for not to obscure the description of the figures.

For the sake of clarity, in all figures, same or like elements and functionality are referred to with the same or like reference numerals.

Figure 3:
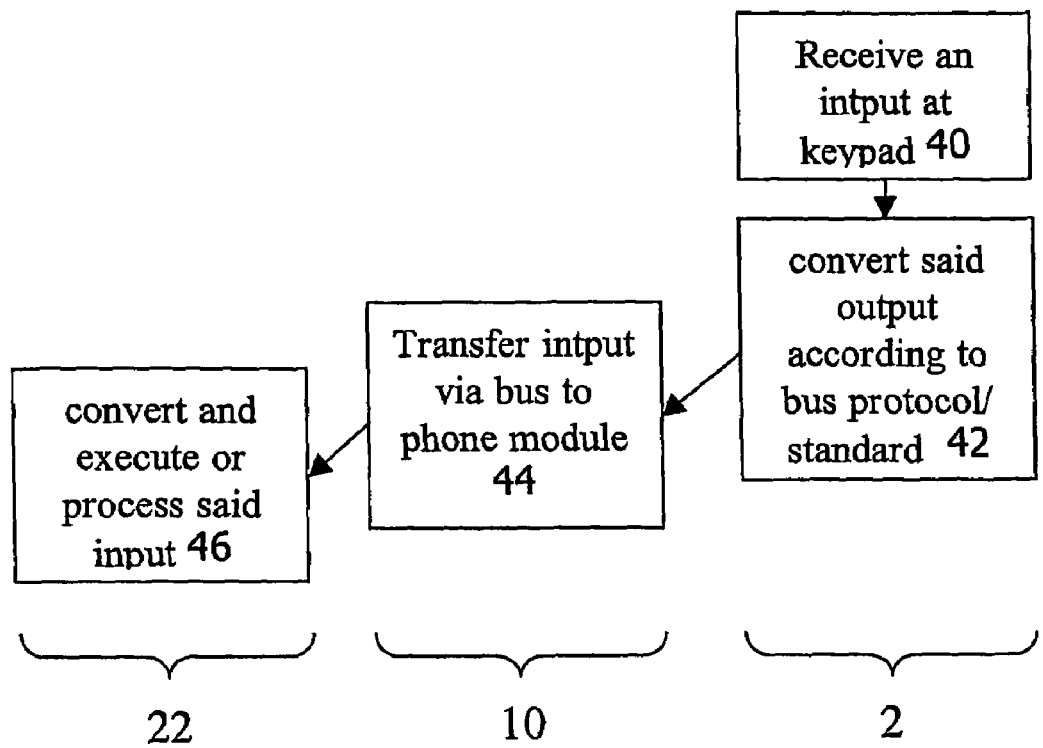
FIG. 3 is an exemplary flowchart of the data transfer from the cover to the communication device to the respective device.
Figure 4:
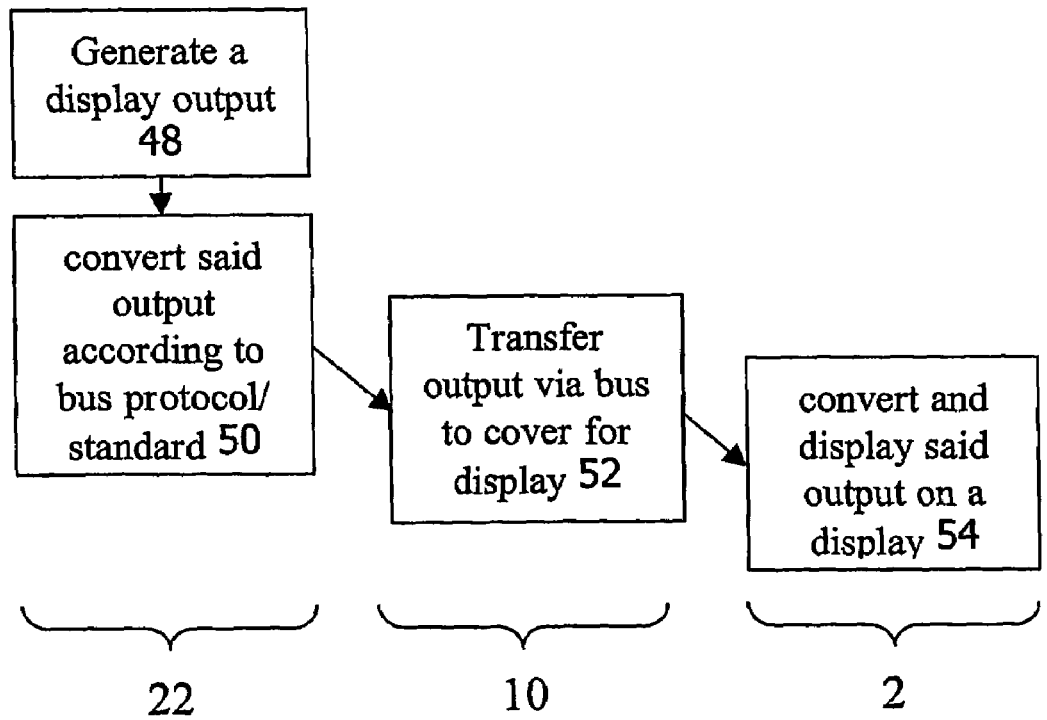
FIG. 4 is an exemplary flowchart of the data transfer from the communication device to the respective intelligent cover, FIG. 5 represent a basic implementation of a data flow between a cover and the device itself.

FIGS. 3 and 4 are exemplary flowcharts of the data communication between a telephone module and a respective intelligent cover. In the case the user wants to perform an input by pressing a button on said cover 2, the cover 2 receives 40 an input on one of the keys of a keypad. A controller of the cover converts 42 this input into standardized signals or messages. The signals or messages can e.g. use Unicode™, ASCII or the like to identify the characters associated with the pressed key. In contrast to the phone module, the cover does not necessarily need to know any information about the telephone or communication module. The generation of said input is performed in the cover. If the cover is not capable to produce the whole set of code signs, it is the cover device that has to draw the right conclusions to enable e.g. number or character input for SMS (Short Messages) or MMS (Multi Media Messages). The standardized code is then transferred 44 via the bus 10 to the phone module and converted into an input signal to be processed or executed 46. In the present example this could be an input of a character for writing an SMS, taking or a rejecting of the call, or selecting or changing one of the settings of said mobile phone.

In basic output functionality, the phone module 22 can generate 48 a display output e.g. an incoming call display content on receiving an incoming call. If the display is integrated in the communication module, this can be executed in a conventional manner. If the display is integrated in the intelligent cover, this can be executed as follows. In a next step a controller in the telephone module generates a signal output 50 according to an information said controller has in regard to display size and display dimensions. The information in regard to display dimensions has to be supplied by the user or the cover. In a next step the said signal output is transferred 52 via the same standardized bus 10 connection as in FIG. 3 to the cover module 2. The bus can be a standard communication bus or a proprietarily developed phone-cover-bus. At the cover 2, the signal output is received processed by a display controller and displayed 54 on a display connected to said controller. In the case the user has not notices the incoming call, the method ends here.

Figure 5:
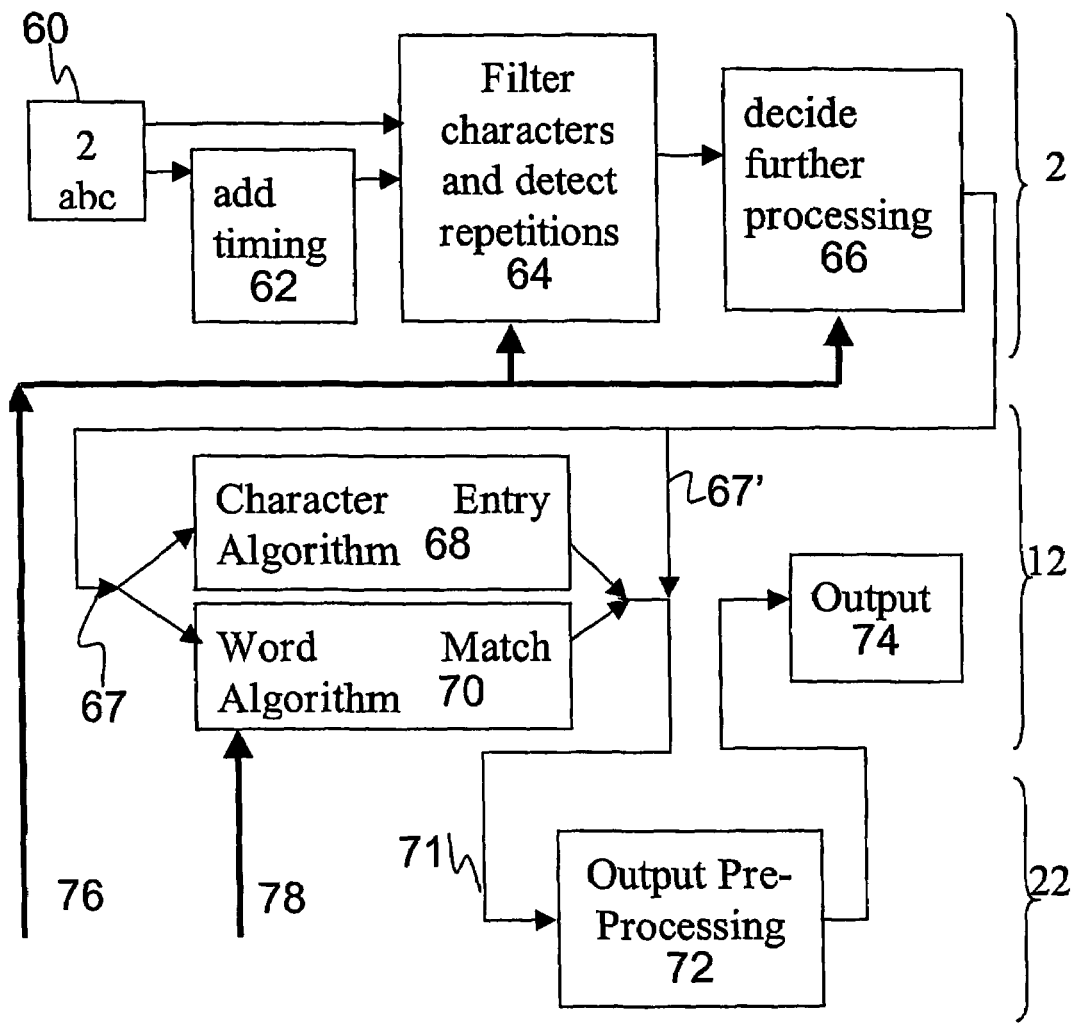

FIG. 5 presents an overview on key input abstraction, according to an embodiment of the present invention. Thus the design and the layout of the keyboard requires no adaptation of the phone software or hardware. The phone and the cover processors communicate via pre-defined signals or message. The phone may select different operation modes. Some examples of different modes are an editor mode (for number, text (or T9) input), gaming mode, menu navigation and key guard control. For example, keyboard layout, key entry caps lock and control keys can be handled by the intelligent cover.

In FIG. 5 a key input is indicated by the key "2/abc" provided with the reference numeral 60. The key is located in the cover, which is indicated by the bracket 2 as in FIGS. 1 and 2. Following the input, a timing element 62 is added. The input 60/62 is then filtered and repetitions are detected 64. Following that, it is decided how the input is further processed 66. Both features or elements 64 and 66 are operated depending on an actual input mode 76 received from the phone module 22. These steps are to be executed in the intelligent cover 2, so the respective hardware elements have to be provided in the cover.

The input may further be further processed 67 e.g. by a character input process 68, a word match algorithm, or be processed not at all as indicated by the arrow 67'.

In the following the character entry 68 and/or word match algorithms 70 can be performed (within the cover and/or the telephone module).

Independent from the actual performed further processing, an output processing 72 is performed in the telephone module. The output 74 itself can be performed either via the telephone module or via the cover module, depending on where the display is actually mounted in.

In the described implementation, the keyboard layout and the keyboard language will be handled within the cover. The cover needs a feedback 76 and 78 from the phone module in dependence of the actual input mode.

Figure 6A:
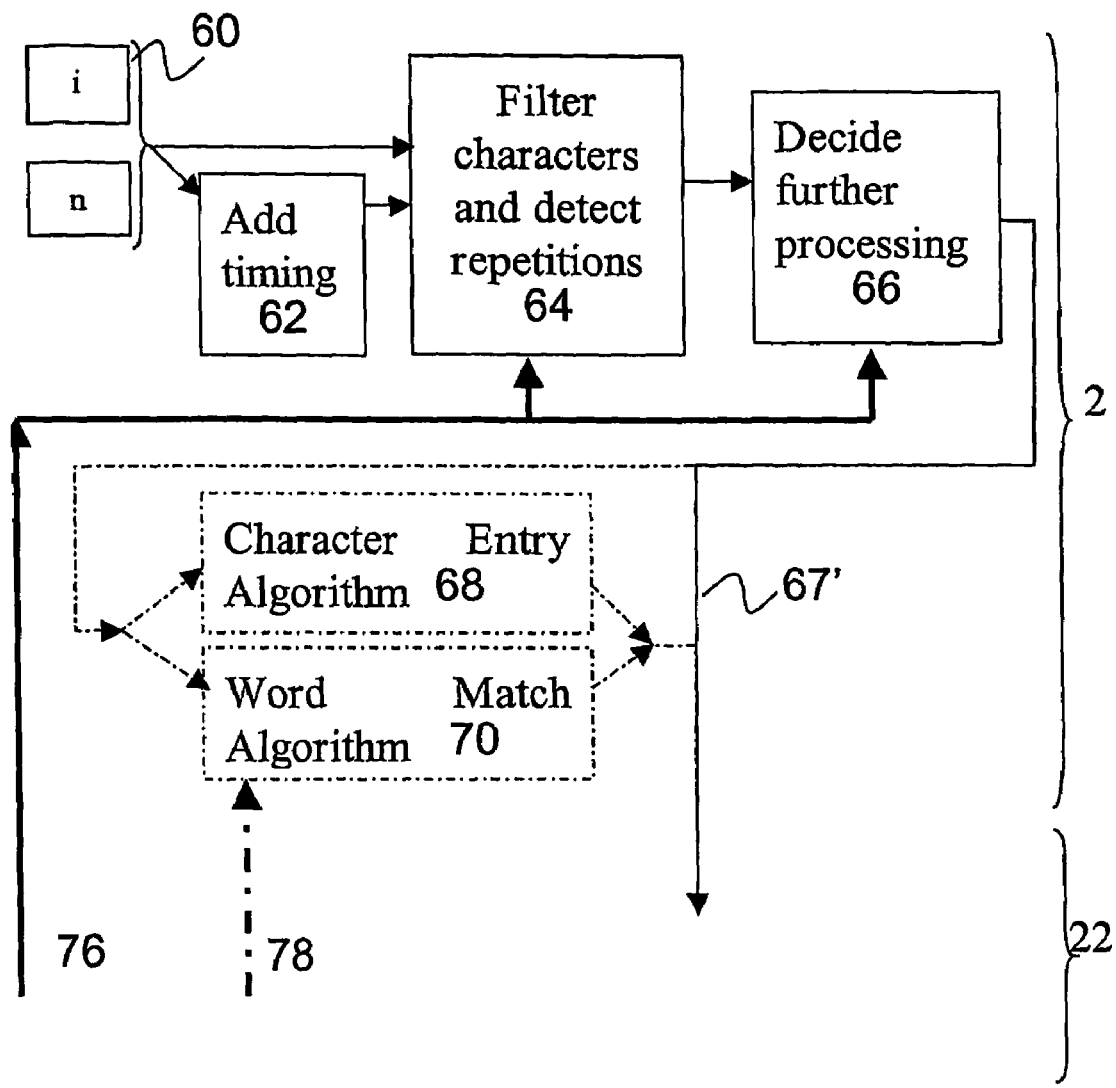
FIGS. 6A to 6C represent the data flow for different implementations of covers.
Figure 6B:
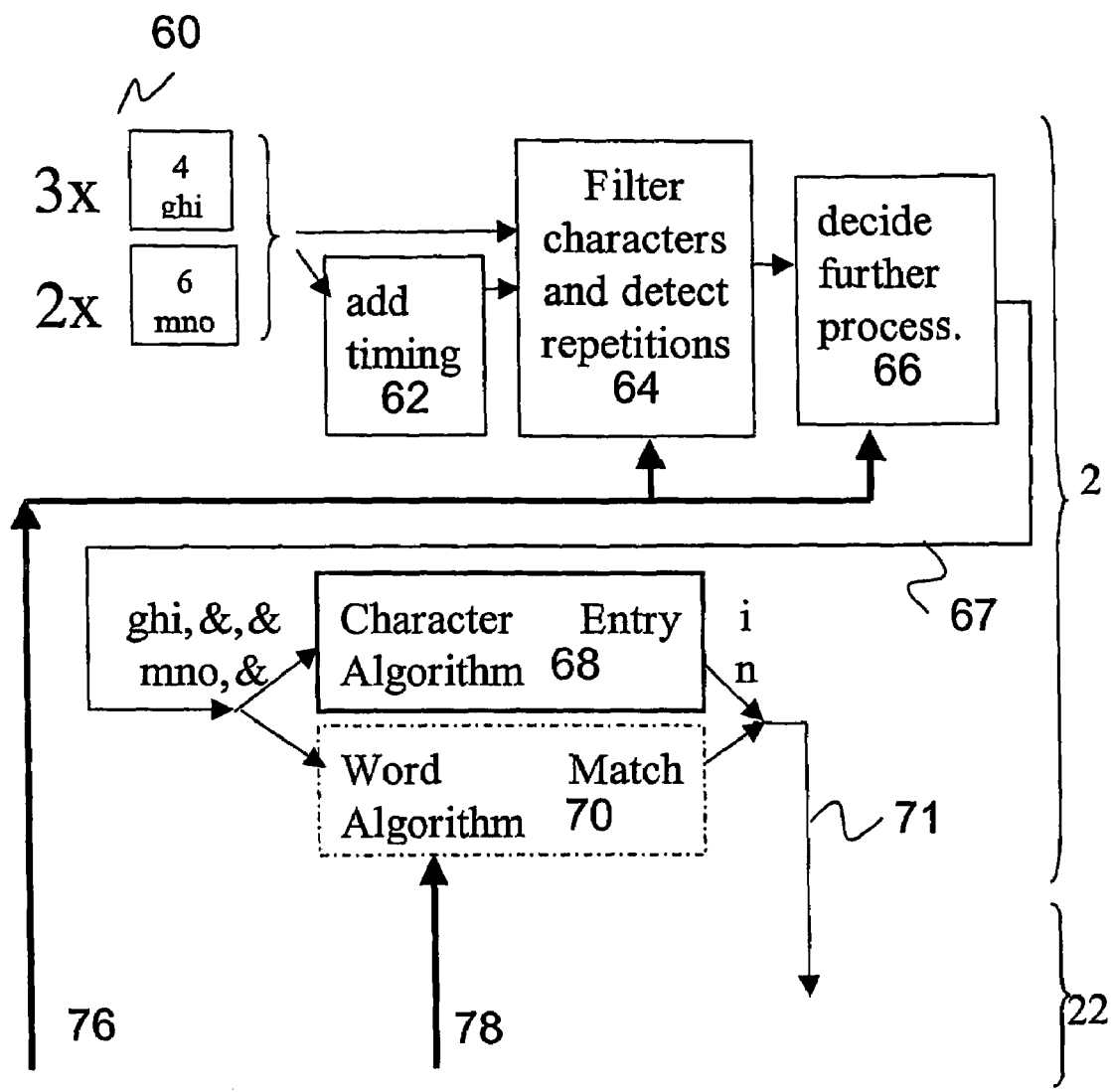
Figure 6C:
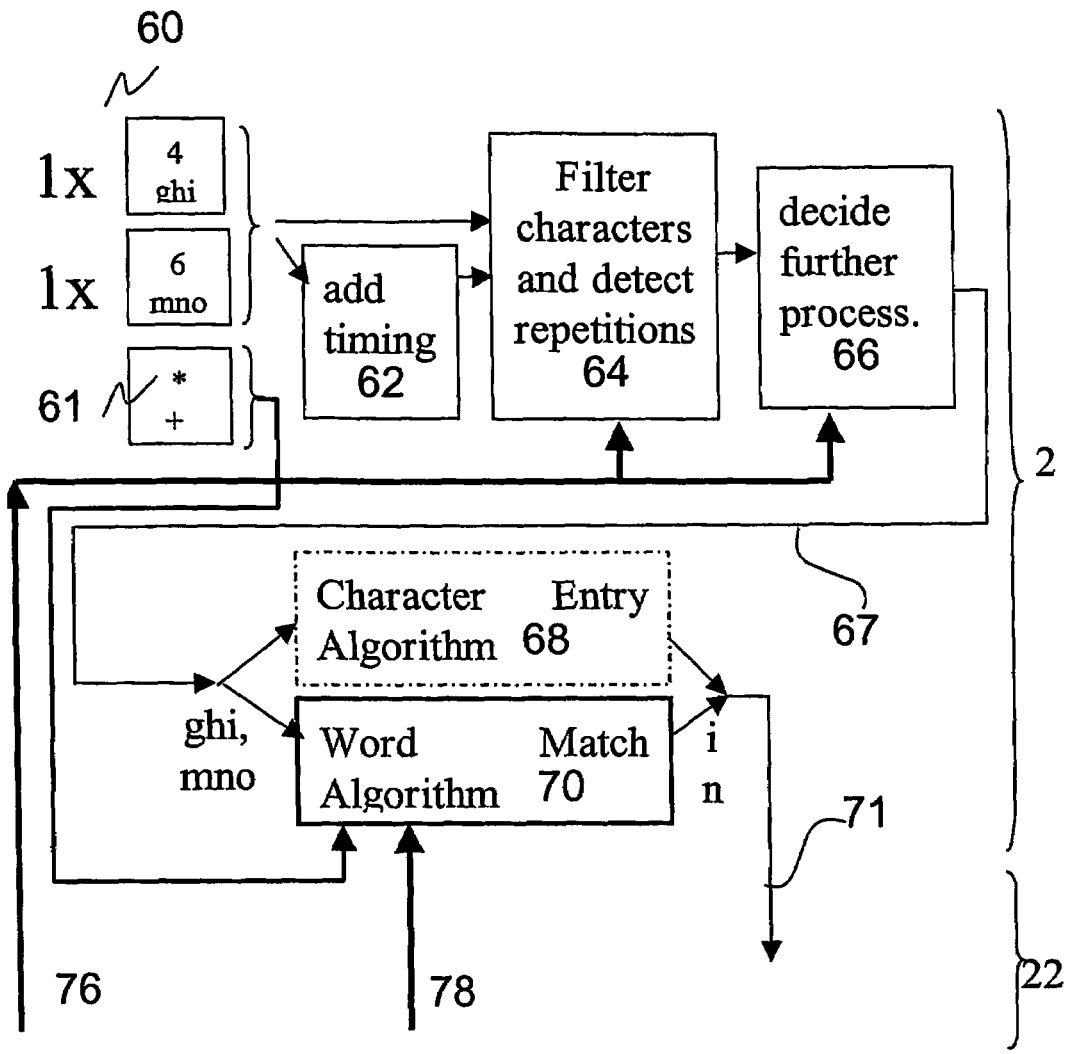

FIGS. 6A to 6C represent the data flow for different implementations of covers and according different input modes.

FIG. 6A represents the data flow for a cover implementation comprising a QWERTY keyboard. By using a QWERTY keyboard the usually necessary features and hardware elements for timing 62, character entry algorithms 68 and word match algorithms 70 can be economized. The mode with a "Typewriter" interface simply requires sophisticated further processing. Therefore, the input is simply detected, filtered and translated into bus code and transferred via the short cut 67' directly to the output post-processing of the telephone module. The mode signals 76 from the telephone just indicate that no further processing is needed. Any kind of language selection can also be economized.

FIG. 6B represents the data flow for a cover implementation comprising an ITU-T keypad as it is known from standard mobile phones. For entering characters the cover requires features and hardware elements for timing 62 and a character entry algorithms 68. A word match algorithm 70 can be economized and is therefore depicted in dotted lines. Any kind of language selection can also be economized. As in the mode with the "Typewriter" interface a simple one-to-one relationship between the user input and the characters transferred via the bus is required. Therefore, the Input is simply detected, filtered and translated in bus code and transferred via the further processing stage of the character entry algorithm 68. An implementation of a character entry algorithm "translates" the input of three times key "4" and two times the key "6" into the word "in". All these steps can be performed in the cover in a way that the phone module may not even distinguish between the signals received from the cover of FIG. 6A or 6B.

The signals 76 from the telephone can indicate that a character entry algorithm is required as the expected input is an alphanumerical input for text entry (SMS, memos) and not only a numerical input (calculator, dialing).

FIG. 6C represents the data flow for a cover implementation comprising a T9-logic enabled IIU-T keypad, as it is also known from standard mobile phones. For entering characters the cover requires features and hardware elements for timing 62 and word matching algorithms 70. A character entry algorithm 68 may be required for supporting the entry of no-match words.

In contrast to the above implementations of FIGS. 6A and 6B a language selection of definition is essential. It is clear that in contrast to the "Typewriter" interface the T9 logic is based on the recognition of user input to suggest the most probable word for a (possibly ambiguous) sequence of ITU-T key inputs. The cover may employ only a single language so that the "selection" is performed when purchasing the cover. Therefore, the input is detected, filtered and analyzed for different possible words stored in a library and additionally possibly based on a selection input to be performed by a user to select one of the different possible words that can be formed from the input sequence. In this implementation of a word match algorithm the input of once key "4" and once key "6" generates the word "in". An additional key "*" can be pressed 61 to select one of the other possible combinations such as "go", "ho" or "hm". All these steps can be performed in the cover in a way that phone module may not even distinguish between the signals received from the cover of FIG. 6A, 6B or 6C.

The signals 76 from the telephone can indicate that a character entry algorithm is required as the expected input is an alphanumerical input for text entry (SMS, memos) and not only a numerical input (calculator, dialing), that a character entry algorithm is expected or that a word matching algorithm is to be applied.

The different input modes and applicable characters can vary in dependence on the active application running in the phone module.

The phone module is aware of the possible, expected or executable input options numbers such as "0 . . . 9, '+', '*', '#', . . . " can be applied to any kind of phone or calculator application.

text input require the numbers and the alphabet 1, 2, 3, . . . + 'a' . . . 'z',.

T9 logic require the ITU-T keyboard and control keys

Gaming applications can use the control keys

Figure 7:
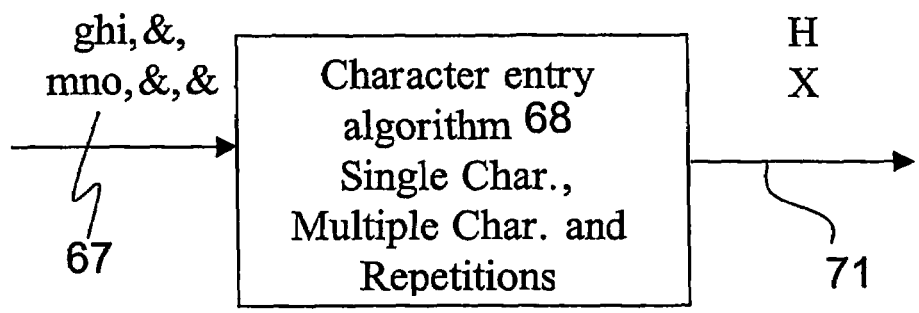
FIG. 7 represents an exemplary implementation of a character recognition algorithm.

FIG. 7 represents an exemplary implementation of a character entry algorithm for an ITU-T keypad.

The algorithm distinguishes between three different input events. A single character entry, a multiple character entry and repetitions.

In the first case

A single character key e.g. 'A' received:
e.g. char_string 'A'
index=0; pos=pos+1; text[pos]=char_string[index].

That is the input received is identified by the character "A" the index is un-changed=0 and the position of the (one character string) increases one step.

In the second case

A multiple character key input is received e.g. 'D, G, J' received:
e.g. char_string='DGJ'
index=0; pos=pos+1; text[pos]=char_string[index]

That is the input received is identified by the characters "DGJ" the index is un-changed=0 and the position of the (three-character string) increases one step.

In the third case

Two repetition symbol received '&':
e.g. 'MNO',&,&
index=(index+2) mod (length (char_string))
text[pos]=char_string[index]

That is the input received identified by the character sequence "'MNO',&,&" the index is changed to =2 to indicate that the third character of said string 'O' is to be selected and the position of the (one character string) increases one step.

The input sequence "ghi,&,mno,&,&" 67 is hence translated by the character entry algorithm 68 into the output sequence "ho" 71.

Figure 8:
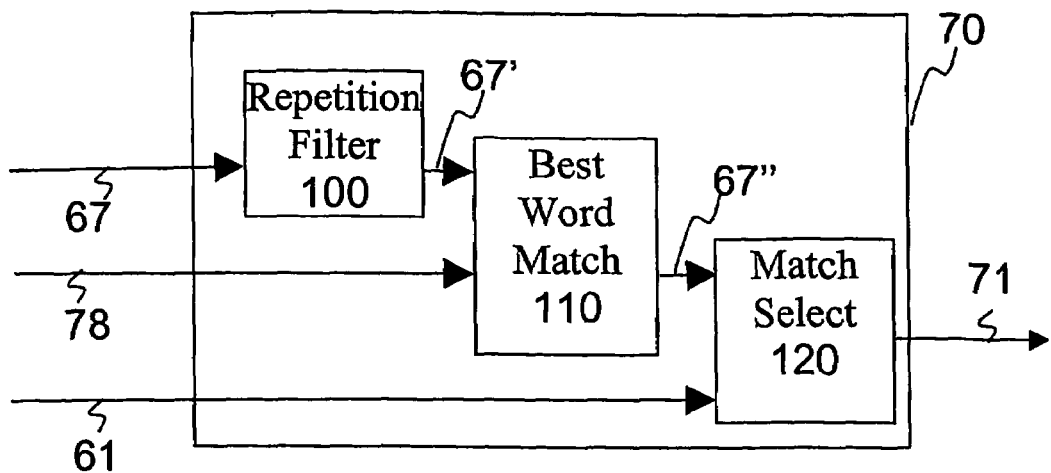
FIG. 8 represents an exemplary implementation of a word match algorithm.

FIG. 8 represents an exemplary implementation of a word match algorithm 70. The depicted word-matching algorithm 70 comprises three sub-algorithms, 100, 110 and 120, to generate from the tree input parameters 67, 78 and 61 a single character sequence 71 representing a word. The first sub-algorithm 100 is a one input repetition filter to eliminate the repetition signs '&' received via the line 67 generated by the input repetition detection 64 of FIGS. 5 to 6. The second sub-algorithm 110 is a word match algorithm e.g. a 'best word' match algorithm to select the most probable word that can be generated from the ambiguous sequence of 3 and 4 character groups. The best word match algorithm 110 requires knowledge of the used language provided by the parameter 78. The match select sub-algorithm provides a simple and fast way for a user to leaf through all words that the sub-algorithm 110 provides.

Figure 9:
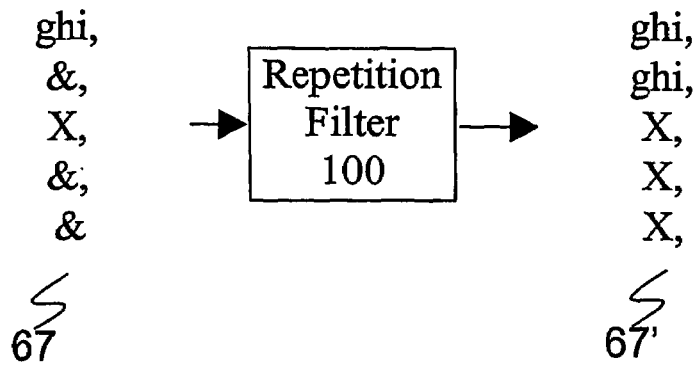
FIGS. 9 to 11 represent exemplary implementations of sub-algorithms that can be used to implement a word match algorithm.
Figure 10:
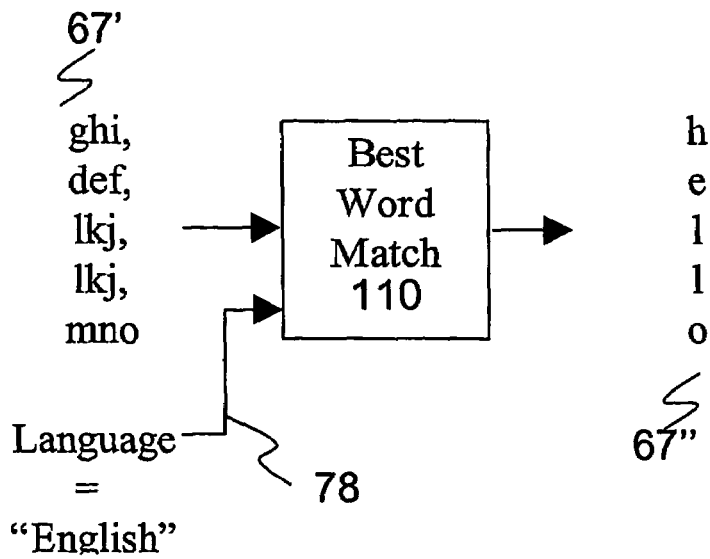
Figure 11:
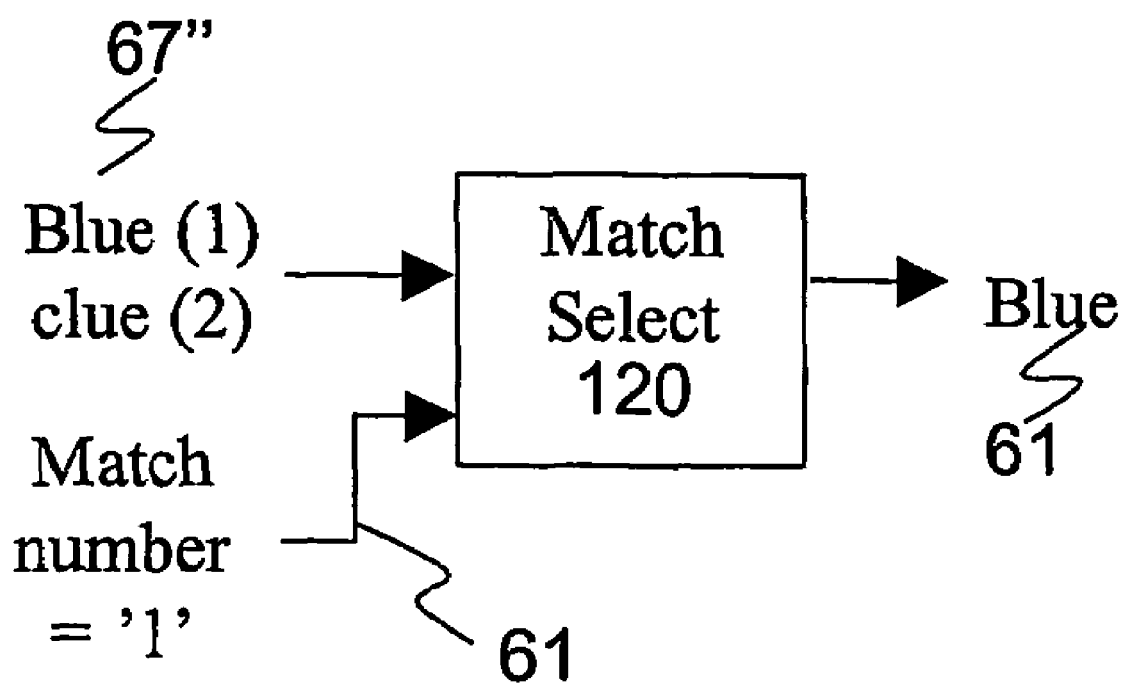

FIG. 9 to 11 represent exemplary implementations of sub-algorithms that can be used to implement a word match algorithm.

FIG. 9 depicts a repetition filter 100. The repetition filter 100 eliminates the repetition signs '&' that generated by the input repetition detection 64 of FIGS. 5 to 6 and that are received via the line 67. Basically, repetition filter 100 cancels the actions performed by the repetition detection 64, as the word matching algorithm 70, or better the following best word match algorithm 110 cannot cope with repetition signs. In more sophisticated systems, the repetition filter may be replaced by a disabling of the input repetition detection 64 of FIGS. 5 to 6 via the mode indication line 76. The repetition filter 100 receives a sequence of character groups and a number of repetition signs 67 and replaces the repetition signs by the previous sequence. In the depicted example the repetition symbol '&' is replaced by previous sequence. Here for example: 'G, H, I', '&', 'X', '&', '&' is replaced by: 'G, H, I', 'G, H, I', 'X', 'X', 'X', wherein 'X' represents an arbitrary 3 or 4 character sequence.

FIG. 10 depicts an implementation of a 'best word' match algorithm 110. The best word match algorithm 110 is to select the most probable word that can be generated from the ambiguous sequence of 3 and 4 character groups. Additionally the best word match algorithm 110 generates all known words that can be combined from the ambiguous input sequence of 3 and 4 character groups. The best word match algorithm 110 requires knowledge of the used language "English" provided by the parameter 78, to select the most probable word, to be suggested to the user in order to minimize the necessary user input. It is clear that the ambiguity increases and decreases with the length of the sequence, so the power of the algorithm increases with the length of the words entered.

The algorithm can be based on the steps of:
Create a match list from the input sequence with/against current dictionary/word book of a chosen language
Order the match list according to a matching order
Send the whole list of matches to the next sub algorithm every time the 'match list' is updated.
Clear the input sequence and start a new word after 'Space' character is received.

FIG. 11 depicts an implementation of a match select sub-algorithm 120 providing a simple and fast way for a user to leaf through all words that the sub-algorithm 110 was able to generate. Under the assumption that the sequence 'a,b,c', 'jkl', 'tuv', 'd,e,f' was entered, the sub-algorithm 110 generated the Match_List:

blue (1)
clue (1)
Match_List [(Match_Number) mod (length (Match_List))] selects Match Item
Match List [1]=Match List [3]=Match List [5]= . . . 'blue'
Match List [2]=Match List [4]=Match List [6]= . . . ='clue'

The user may change between the two found entries in the list by pressing 61 e.g. the button "*". In the figure the match select algorithm 120 selects one element in the matching list 67". In the depicted example the selection can be approved by the reception of a space (not depicted).

Compared to the number of keys to be pressed using a QWERTY keyboard, the t9 logic provides an only slightly increased number of buttons to be pressed. Compared to the character entry algorithm, the number of keys to be pressed can nearly be halved. The t9-logic is further not subjected to any kind of timer delay, as in the case of the character entry algorithm when entering double characters, or character combination occurring in a "one button triplet".

It may be noted that the text of the specification does not disclose any mechanical of electrical or optical embodiments of how the interface between the phone module and the cover module may actually be implemented, as this is not vital for the present invention. So it may also be possible to us e.g. Bluetooth as a non-galvanic data interface between the cover and the phone module. In such a case even a mechanical interface may be economized, as the cover module and the mobile communication module may simply be releasably connected to each other. Another possibility would even be to connect to a completely external keyboard using the same protocol via a wireless or wired interface.

The advantages of the present invention reside in:
Late customizing is possible just by assembly of different intelligent covers, even after the launch of a new phone module.
More diversification is possible due to different combinations of different phones and different intelligent cover due to a standardized interface.
The phone module can be re-used between phones. No GSM/UMTS type approval would be necessary or efforts for type approval can be reduced because the critical parts remain unchanged. The engineering and testing effort of creating different phones/versions will get much lower.
The user can change and update the phone UI functionality. There is no need to buy another phone, but just another cover.
The user can change and update the phone standard without changing the UI (user interface) functionality. There is no need to learn a new UI functionality when changing the phone standard by buying another phone, but not another cover.
The cover can store details on all features for the feature recognition routine in the phone module. For example, the phone module can handle different display sizes or a joystick.
Alternatively, the cover may abstract the phone module from detailed feature implementation by providing an abstract interface. The cover may deliver a driver (or a download source) used to operate the feature or function All these advantages can be gained upon the drawback of a slightly enhanced mechanical effort because cover and phone may be handled separately.

The present invention is providing an improved choice between a simple ITU-T keypad; QWERTY-keyboard and the choice between differently sized and color enabled displays.

The whole design of mobile communication devices can arbitrarily be adapted to the preferences of users. Manufactures of mobile communication device equipment just need to provide a casing, a keyboard and a display to be able to offer or produce mobile phone module holders. Mobile phones which cater for the needs of people with disabilities can be provided with a minimum effort for generating just an appropriate UI or cover. So the user of cochlea implants or blind people using Braille interfaces or voice output based displays need not longer fear new mobile phone standards as the well-known user interfaces can also be used with future communication and telephone communication standards.

This application contains the description of implementations and embodiments of the present invention with the help of examples. A person skilled in the art will appreciate that the present invention is not restricted to details of the embodiments presented above, and that the invention can also be implemented in another form without deviating from the characteristics of the invention. The embodiments presented above should be considered illustrative, but not restricting. Thus the possibilities of implementing and using the invention are only restricted by the enclosed claims. Consequently various options of implementing the invention as determined by the claims, including equivalent implementations, also belong to the scope of the invention.

The invention claimed is:

1. A mobile communication device cover comprising:
a keyboard,
a display,
a cover processor connected to said keyboard and display, and
a bus interface, for removable connection of said cover processor to a mobile communication module,
wherein said bus interface is configured to operate with a plurality of mobile communication modules, and
wherein said cover processor is configured to process signals between said display and a processor of any one of said plurality of said mobile communication modules and signals between said keyboard and a processor of any one of said plurality of said mobile communication modules such that input from a user received at said cover is converted into standardized signals or messages to be transferred for execution to a processor of any one of said plurality of said mobile communication modules, wherein said signals are communicated via said bus interface.

2. The mobile communication device cover according to claim 1, wherein said cover further comprises a controller.

3. The mobile communication device cover according to claim 1, wherein said cover further comprises a battery module.

4. The mobile communication device cover according to claim 1, wherein said cover further comprises a slot for receiving a communication module.

5. The mobile communication device cover according to claim 1, wherein the cover processor comprises a separate display processor configured to process signals between said display and a processor of any one of said plurality of mobile communication modules.

6. A mobile communication module comprising a radio interface for connecting to a mobile communication network, and a standardized bus interface, to connect said communication module to a cover having at least a keyboard, a display, and a cover processor, wherein said mobile communication module does not have a display, and wherein said cover processor is configured to process signals between said display and a processor of any one of said plurality of said mobile communication modules and signals between said keyboard and a processor of any one of said plurality of said mobile communication modules such that input from a user received at said cover is converted into standardized signals or messages to be transferred for execution to a processor of any one of said plurality of said mobile communication modules, wherein said signals are communicated via said standardized bus interface.

7. The mobile communication module according to claim 6, wherein said radio interface comprises a cellular telephone interface.

8. The mobile communication module according to claim 7, further comprising a battery and a minimal user interface to provide basic communication functionality.

9. The mobile communication module according to claim 6, wherein said radio interface comprises a cordless telephone interface.

10. The mobile communication module of claim 6, wherein said cover processor of said cover comprises a separate display processor configured to process signals between said display and a processor of any one of said plurality of mobile communication modules.

11. A mobile communication device comprising an intelligent mobile communication cover comprising:
a keyboard,
a display,
a cover processor connected to said keyboard and display, and
a bus interface, for removable connection of said cover processor to a mobile communication module,
wherein said bus interface is configured to operate with a plurality of mobile communication modules, and
wherein said cover processor is configured to process signals between said display and a processor of any one of said plurality of said mobile communication modules and signals between said keyboard and a processor of any one of said plurality of mobile communication modules such that input from a user received at said cover is converted into standardized signals or messages to be transferred for execution to a processor of any one of said plurality of said mobile communication modules, wherein said signals are communication via said bus interface; and
a mobile communication module having a radio interface for connecting to a mobile communication network, and a bus interface to connect said communication module to said cover via the bus interface of the cover, wherein said mobile communication module does not have a display.

12. The mobile communication device of claim 11, wherein said cover processor of said intelligent mobile communication cover comprises a separate display processor configured to process signals between said display and a processor of any one of said plurality of mobile communication modules.

13. A method comprising:
receiving input from a user at a mobile communication device cover having a keyboard, a display, and an interconnected cover processor,
converting said input according to a specified protocol into standardized signals or messages,
transferring said converted input via a specified bus to a mobile communication module of a mobile communication device,
processing said transferred input in said mobile communication module and
receiving display information from the mobile communication device and communicating said information to said cover processor for presentation to said display of said cover by a bus interface of said cover.

14. The method according to claim 13, further comprising:
generating/receiving data to be output in said communication module,
converting said output according to a specified protocol in said communication module,
transferring said converted output via a specified bus to said communication device cover, and
outputting said received output via a display in said cover.

15. A computer readable medium containing computer executable instructions to carry out the method of claim 13 when said instructions are run on a computer or network device.

16. A computer readable medium containing computer executable instructions, said instructions downloadable from a server, said instructions to carry out the method of claim 13 when said instructions are run on a computer or network device.

17. A mobile communication device cover comprising:
means for inputting data,
means for displaying data,
means for processing data connected to said means for inputting data and said means for displaying data, and
means for connecting said means for processing to a mobile communication module,
wherein said means for connecting is adapted to operate with a plurality of mobile communication modules, and
wherein said means for processing data is configured to process signals between said means for displaying and a processor of any one of said plurality of said mobile communication modules and signals between said means for inputting data and a processor of any one of said plurality of said mobile communication modules such that input from a user received at said cover is converted into standardized signals or messages to be transferred for execution to a processor of any one of said plurality of said mobile communication modules, wherein said signals are communicated via said means for connecting.

18. The mobile communication device cover according to claim 17, wherein said means for processing comprises a separate means for processing signals between said display and a processor of any one of said plurality of mobile communication modules.

* * * * *